United States Patent
Stute (10) Patent No.: US 10,836,133 B2
(45) Date of Patent: Nov. 17, 2020

(54) HONEYCOMB CORE FOR DIMENSIONALLY STABLE SANDWICH COMPONENTS

(71) Applicant: Airbus DS GmbH, Taufkirchen (DE)

(72) Inventor: Thomas Stute, Bermatingen (DE)

(73) Assignee: AIRBUS DS GMBH, Taufkirchen (DE)

( * ) Notice: Subject to any disclaimer, the term of this patent is extended or adjusted under 35 U.S.C. 154(b) by 297 days.

(21) Appl. No.: 15/231,886

(22) Filed: Aug. 9, 2016

(65) Prior Publication Data

US 2017/0043549 A1 Feb. 16, 2017

(30) Foreign Application Priority Data

Aug. 14, 2015 (DE) .................. 10 2015 010 436

(51) Int. Cl.
  *B32B 3/12* (2006.01)
  *G02B 5/08* (2006.01)
  (Continued)

(52) U.S. Cl.
  CPC .............. *B32B 3/12* (2013.01); *B32B 3/18* (2013.01); *B32B 3/20* (2013.01); *B32B 27/04* (2013.01);
  (Continued)

(58) Field of Classification Search
  CPC ........................... B32B 37/146; B32B 3/12
  See application file for complete search history.

(56) References Cited

U.S. PATENT DOCUMENTS 4,578,303 A * 3/1986 Kundinger ............... E04C 2/36
  428/116
5,150,507 A * 9/1992 Goela ...................... E04C 2/36
  156/89.22

(Continued)

FOREIGN PATENT DOCUMENTS

| DE | 102007007554 | 8/2008 |
| EP | 0649036 | 4/1995 |
| EP | 1950034 | 7/2008 |

OTHER PUBLICATIONS

English language translation of EP 064036 A1, generated on Aug. 2, 2018 with Espacenet (http://www.epo.org/searching-for-patents/technical/espacenet.html#tab-1). Paragraph numbers inserted by Examiner.*

(Continued)

*Primary Examiner* — Mark Ruthkosky
*Assistant Examiner* — Julia L Rummel
(74) *Attorney, Agent, or Firm* — Greer, Burns & Crain, Ltd.

(57) ABSTRACT

A honeycomb core for dimensionally stable components (e.g., a reflector) in sandwich construction with a plurality of cells with a triangular cell cross section made from carbon fiber reinforced plastic. The honeycomb core is assembled from flat laminate strips by plugging, wherein the laminate strips have slots running transversely to the extension direction respectively on their longitudinal side. The laminate strips are connected to one another in such a way that the slots of three laminate strips engage in a positive-locking manner in one another at a respective intersection point to form the corners of the cells of the honeycomb core.

14 Claims, 4 Drawing Sheets

(51) Int. Cl.
B32B 27/04 (2006.01)
B32B 3/18 (2006.01)
B32B 3/20 (2006.01)
B32B 37/14 (2006.01)
B32B 5/02 (2006.01)

(52) U.S. Cl.
CPC .............. *B32B 37/146* (2013.01); *G02B 5/08* (2013.01); *B32B 5/02* (2013.01); *B32B 2250/40* (2013.01); *B32B 2260/021* (2013.01); *B32B 2260/046* (2013.01); *B32B 2262/106* (2013.01); *B32B 2307/734* (2013.01); *B32B 2398/10* (2013.01); *B32B 2551/08* (2013.01); *B32B 2605/00* (2013.01)

(56) References Cited

U.S. PATENT DOCUMENTS

| | | |
|---|---|---|
| 5,741,445 A | 4/1998 | Taylor et al. |
| 2010/0233424 A1* | 9/2010 | Dan-Jumbo .......... B29C 70/202 428/113 |

OTHER PUBLICATIONS

Uusitalo, K.; "Designing in Carbon Fibre Composites"; Master's Thesis presented at Chalmer's University, 2013, p. p. i-69, Appendix A.*
Stute, T.; "Composite Ultra Lightweight Mirrors"; Proceedings 34th Liege International Astrophysics Colloquium, 1998, p. 295-299.*
German Search Report, dated Apr. 19, 2016, priority document.

\* cited by examiner

HONEYCOMB CORE FOR DIMENSIONALLY STABLE SANDWICH COMPONENTS

CROSS-REFERENCES TO RELATED APPLICATIONS

This application claims the benefit of the German patent application No. 10 2015 010 436.5 filed on Aug. 14, 2015, the entire disclosures of which are incorporated herein by way of reference.

BACKGROUND OF THE INVENTION

The invention relates to a honeycomb core for dimensionally stable components in a sandwich construction with a plurality of cells with a triangular cell cross section made from carbon fiber reinforced plastic.

A honeycomb core of this kind is required, for example, for base plates of optical instruments, optical benches and optical mirrors in sandwich construction, as described in EP 0 649 036 A1. Such optical mirrors are required, e.g., for astronomical telescopes, for the transmission of laser beams, or for the concentration of solar radiation. Fundamental requirements for these applications are extreme dimensional stability under all environmental conditions occurring and low weight.

Conventional lightweight construction core materials for a sandwich construction, such as, e.g., foamed materials, honeycomb cores of aluminum, honeycomb cores of aramid fibers or Nomex honeycombs, have a thermal expansion coefficient that is too high for applications calling for dimensional stability. In many cases, this leads to an intolerable deformation in the event of a temperature change. Due to the pronounced L- and W-directions, honeycomb cores of such materials have direction-dependent, anisotropic mechanical properties that likewise lead to undesirable direction-dependent component behavior.

The problem of the thermal expansion coefficient can be solved by honeycomb cores made from carbon fiber reinforced plastic (CFRP). However, commercially available honeycombs of carbon fiber reinforced plastic are restricted in respect of possible applications and very expensive.

SUMMARY OF THE INVENTION

An object of the invention is to specify a honeycomb core for dimensionally stable components in sandwich construction, which can be manufactured cost-effectively and permits a high flexibility with respect to possible applications. The honeycomb core is to have a high dimensional stability as well as an adjustable thermal expansion coefficient.

Another object of the invention is to specify a reflector in a sandwich construction, in particular for an optical mirror with a lightweight construction, as well as a sandwich panel with a lightweight construction, which reflector or which sandwich panel has high dimensional stability with low weight.

Another object of the invention is to provide a method for the cost-effective manufacture of a honeycomb core for dimensionally stable components in a sandwich construction.

A honeycomb core with a plurality of cells with a triangular cell cross section made from carbon fiber reinforced plastic is proposed, wherein the honeycomb core is assembled from flat laminate strips by insertion. The laminate strips each have on their longitudinal side, slots running transversely to the extension direction, wherein the laminate strips are connected to one another in such a way that the slots of three laminate strips engage in one another in a positive-locking manner at a respective intersection point to form the corners of the cells of the honeycomb core.

According to the invention, a honeycomb core with quasi-isotropic triangular cells in a cheap plug-in design is provided, which can be fabricated cost-effectively without elaborate devices. In a honeycomb core of this kind, the thermal expansion coefficient can be set to 0 or another desired value. It is likewise possible to determine the size of the cells of the honeycomb core without great effort.

The honeycomb core is assembled from a number of laminate strips of a first type, a number of laminate strips of a second type and a number of laminate strips of a third type. The laminate strips of the first type comprise first and second slots distributed at regular intervals, wherein the first slots, starting out from a first longitudinal side of the respective laminate strip, extend by one third transversely to the extension direction. The second slots extend, starting out from a second longitudinal side, by one third transversely to the extension direction of the respective laminate strip. The first and the second slots run in a line. The line thus runs transversely to the extension direction of the respective laminate strip or at a 90° angle to the extension direction.

The laminate strips of the second type comprise slots distributed at regular intervals, wherein the slots, starting out from a first longitudinal side of the respective laminate strip of the second type, extend by two thirds transversely to the extension direction. Here, too, transversely to the extension direction means a progression at a 90° angle to the extension direction of the relevant laminate strip of the second type.

The laminate strips of a third type comprise slots distributed at regular intervals, wherein the slots, starting out from a second longitudinal side, extend by two thirds transversely to the extension direction. Here, too, transversely to the extension direction means a progression at a 90° angle to the extension direction of the relevant laminate strip of the third type.

In this description, first longitudinal sides of the laminate strips of the different types are those longitudinal sides that form, e.g., the front of the honeycomb core. Correspondingly, the second longitudinal sides of the laminate strips of any type are those longitudinal sides that then form the back of the honeycomb core.

By plugging the laminate strips of the three different types together, a honeycomb core that is stable in itself can be provided. Due to the respective properties of the respective laminate strips, this honeycomb core then has the desired dimensional stability and the set thermal expansion coefficient.

Beyond the laminate strips, no further elements are necessary to provide a stable structure. The required dimensional stability results solely from the positive-locking connection of the different laminate strips in the area of their intersection points.

It is expedient if the spacings of the slots running in the transverse direction of a laminate strip of a first type, the spacings of the slots running in the transverse direction of a laminate strip of the second type and the spacings of the slots running in the transverse direction of a laminate strip of the third type are dimensioned in such a way that these correspond to the length of the lateral edges of the triangular cell cross section. The spacings of the slots running in the transverse direction of a laminate strip of a certain type can correspond to the spacings of the slots running in the transverse direction of one or of both other laminate strips of the other types. The spacings of the slots running in the transverse direction can thus be identically dimensioned on the laminate strips of the first, the second and the third type. This results in a honeycomb core that comprises cells of equilateral triangles.

The honeycomb core is also characterized by the fact that the laminate strips of an identical type are arranged parallel to one another in the honeycomb core. This results in a regular structure of the cells of the honeycomb core, due to which a high dimensional stability as well as isotropic properties of the honeycomb core can be achieved.

If the cells comprise equilateral triangles and the laminate strips are formed quasi-isotropic in their own right, the cells have quasi-isotropic properties. The honeycomb core has isotropic properties as a result of this. Furthermore, a high dimensional stability is yielded by equilateral triangles.

It is expedient if the laminate strips comprise cured carbon fiber reinforced plastic.

To provide quasi-isotropic triangular cells as well as a honeycomb core with isotropic properties, it is expedient if the laminate strips of all types have an identical thickness. The weight of the honeycomb core on the one hand and its stability on the other are set by the thickness of the laminate strips. On the other hand, the isotropy of the honeycomb core can be provided in a simple manner. Different suitable dimensions can be selected according to the application. The dimensions can be determined in a suitable manner by calculation or experiments.

It can also be expedient for the slots of three laminate strips (of the three different types) engaging in one another to be fixed at an intersection point by an adhesive or a synthetic resin. To this end, the adhesive or the synthetic resin can be introduced into the slot of one of the laminate strips and/or several laminate strips before the laminate strips of the different types are plugged together.

The honeycomb core is distinguished, according to a further configuration, in that the lateral edges of the laminate strips of at least a main side of the honeycomb core lie in one plane following the completed assembly. A honeycomb core with two parallel main sides can be provided by this. Alternatively, a honeycomb core can be provided in which the lateral edges of the laminate strips of one main side lie in one plane, while the lateral edges of the other main side have the shape of a convex surface, for example.

An insert, in particular a hollow insert, into which a load can be introduced can be arranged in at least some of the cells of the honeycomb core. Such inserts can be arranged in adjacent cells of the honeycomb core, for example. A particular insert can be arranged in all cells of the honeycomb core. A particular insert can be arranged only in some cells, so that, e.g., a cell with an insert is surrounded by cells without an insert. Which cells are provided with an insert depends substantially on the respective application and the loads occurring that are to be processed.

The insert expediently has a triangular cross section matched to the cell, wherein a respective insert wall abuts an assigned cell wall. It is ensured by this that the insert is arranged in a particular cell without play and cannot at any point execute an undesirable movement relative to the cell. Moreover, an optimized distribution of force can be facilitated between the insert and the cell walls.

One or more of the following elements can be used as an insert: a cured CFRP shaped piece; a wet-formed, laminated composite insert; a shaped metal piece, a shaped piece of rigid foam; a shaped piece of plastic.

The invention also creates a sandwich panel in lightweight construction, in particular for dimensionally stable applications. A sandwich panel of this kind comprises a honeycomb core formed as in this description. In a sandwich panel of this kind, the honeycomb core can be combined with a front and rear covering layer. Such a sandwich panel can also be formed as an optical bench, on which one or more optical elements are arranged on one covering layer.

The invention also creates a reflector in sandwich construction, in particular for an optical mirror in lightweight construction. Such a reflector comprises a honeycomb core formed as in this description. On such a reflector, the honeycomb core can be combined with a front and rear covering layer, wherein one of the two covering layers can be provided with a mirror backing layer. Such a mirror backing layer can be optically polished and/or coated with a reflection layer. The configuration of such a reflector can take place in principle in any manner known to the person skilled in the art.

The invention also creates a method for the manufacture of a honeycomb core described as above and below. The method comprises the following steps:

a) provision of a number of laminate strips of the first type, provision of a number of laminate strips of the second type and provision of a number of laminate strips of the third type;

b) arrangement of the number of laminate strips of the second type on a level base, so that their slots point away from the base;

c) plugging of the number of laminate strips of the first type from above into the laminate strips of the second type, so that the slots of the laminate strips of the first type, which face the laminate strips of the second type, engage in the slots of the laminate strips of the second type;

d) plugging of the number of laminate strips of the third type from above into the number of laminate strips of the first type, so that the slots of the laminate strips of the third type engage in the slots of the laminate strips of the first type, which face the laminate strips of the third type.

According to the spacings of the slots of the laminate strips of the respective types and the wall thickness of the respective laminate strips, the honeycomb core can be adapted flexibly to design requirements of a target application.

In one configuration of the method, it is provided to arrange the number of laminate strips of the third type parallel on the base.

In another configuration, the number of laminate strips of the third type are arranged in a direction perpendicular to their respective extension direction with identical spacing on the base.

Another expedient configuration of the method provides that the number of laminate strips of the second type is aligned in such a way that assigned slots of adjacent laminate strips of the second type form a line. Along this line a laminate strip of the first type is then connected by insertion in a positive-locking manner to the number of laminate strips of the second type arranged in parallel.

BRIEF DESCRIPTION OF THE DRAWINGS

The invention is explained in greater detail below with reference to a practical example in the drawing.

DETAILED DESCRIPTION OF THE PREFERRED EMBODIMENTS

Figure 1:
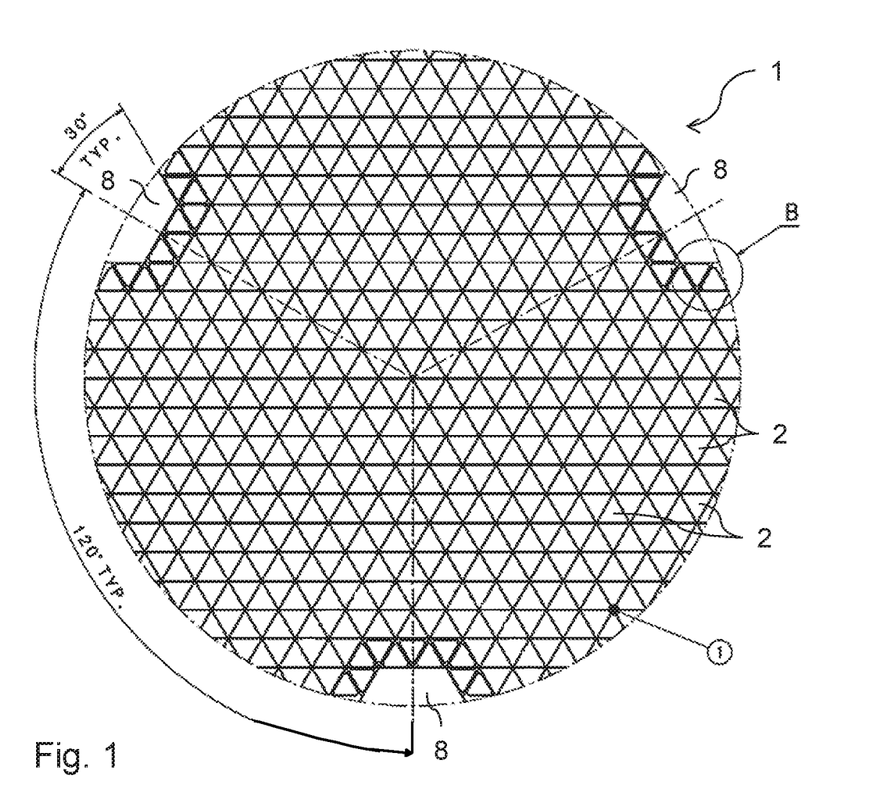
FIG. 1 shows a top view of a honeycomb core according to the invention.

FIG. 1 shows a top view of a honeycomb core 1 according to the invention. The honeycomb core 1, which is round in the top view, comprises a plurality of cells 2 with a triangular cell cross section. As can readily be recognized, the cells are formed of equilateral triangles, so that their cell walls assume an angle of 60° in relation to one another.

The honeycomb core 1 has three recesses 8 distributed over the outer circumference, which are offset respectively by 120° to one another and in which no cells are provided. The recesses 8 are used to take up holding elements, which are not shown, in order to be able to attach the honeycomb core 1 via one or more brackets. Since neither the recesses 8 nor the brackets are of significance for the present invention, a more detailed description has been dispensed with.

Figure 2:
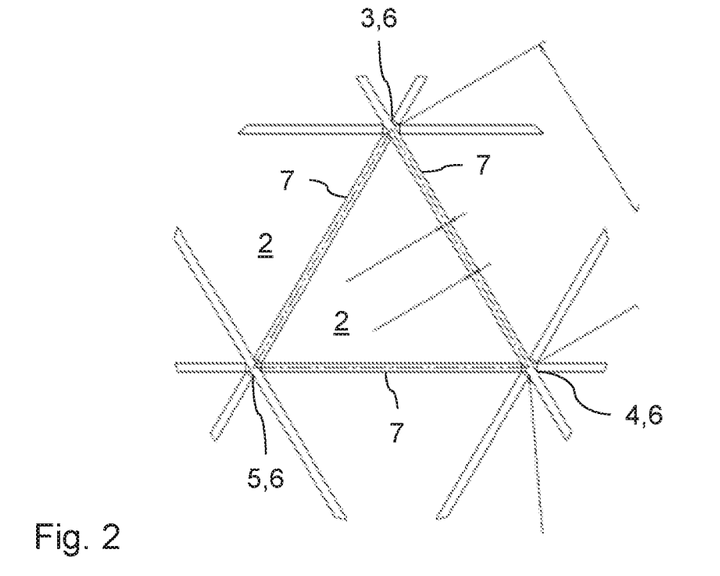
FIG. 2 shows an enlarged representation of a triangular cell formed in the honeycomb core from FIG. 1.

The triangular cell cross section of the cells 2 is evident from the enlarged representation in FIG. 2. The cell 2 shown in the center has three corners 3, 4, 5, which are also described as intersection points 6 of the respective cell walls in the following description. As described, the cell walls 7 of these cells 2 assume an angle of 60° in relation to one another.

The thickness of the cell walls 7 is preferably of identical dimensions. Quasi-isotropic properties of a cell 2 and thus of the honeycomb core 1 as a whole can be provided by this. The wall thickness of the cell walls 7 is between 0.4 and 0.8 mm, for example. In principle the wall thickness can also be chosen differently according to the requirements of a target application. The length of the cell walls 7 is likewise selected according to the target application. The longer the walls selected, the fewer the cells a honeycomb core has for a given diameter. It can be easily constructed thereby. If greater stability is the aim, a correspondingly shorter wall length of the cell walls 7 is selected. The person skilled in the art can determine a precise measurement by calculation and/or experiments for a given target application.

The honeycomb core 1 as shown in FIG. 1 is assembled from a plurality of slotted, cured, flat and quasi-isotropic CFRP laminate strips. The cells in the form of equilateral triangles then result from the assembly, as shown in FIG. 2.

Figure 4:
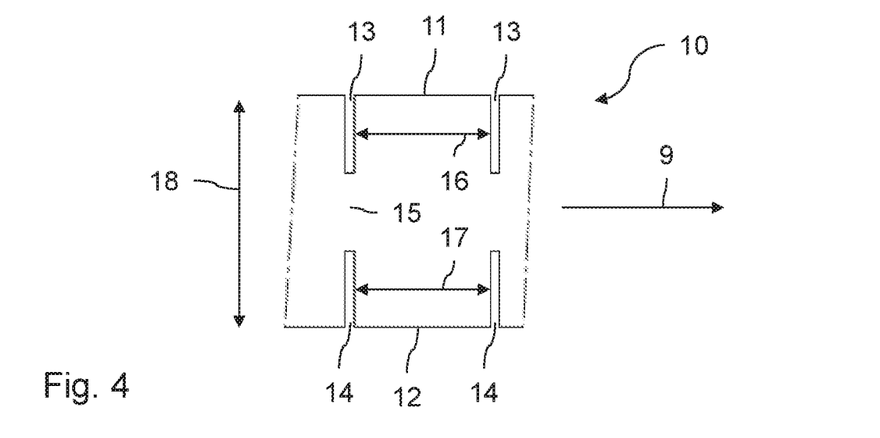
FIG. 4 shows a section of a laminate strip of a first type in a side view.
Figure 5:
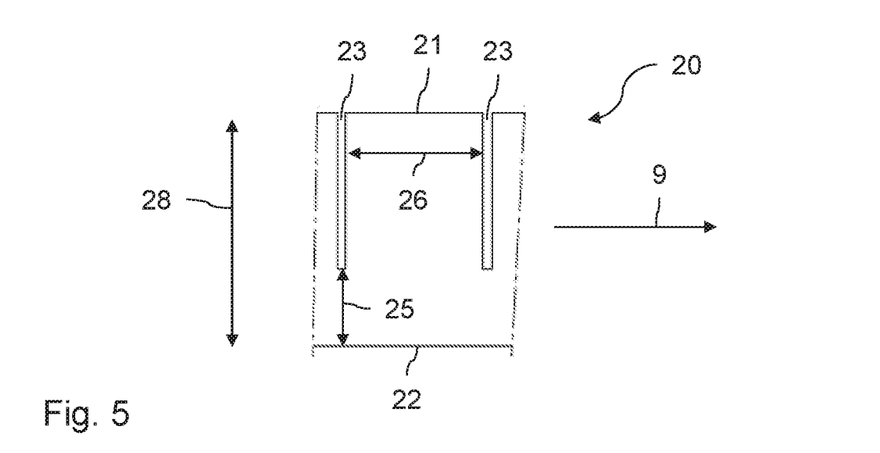
FIG. 5 shows a section of a laminate strip of a second type in a side view.
Figure 6:
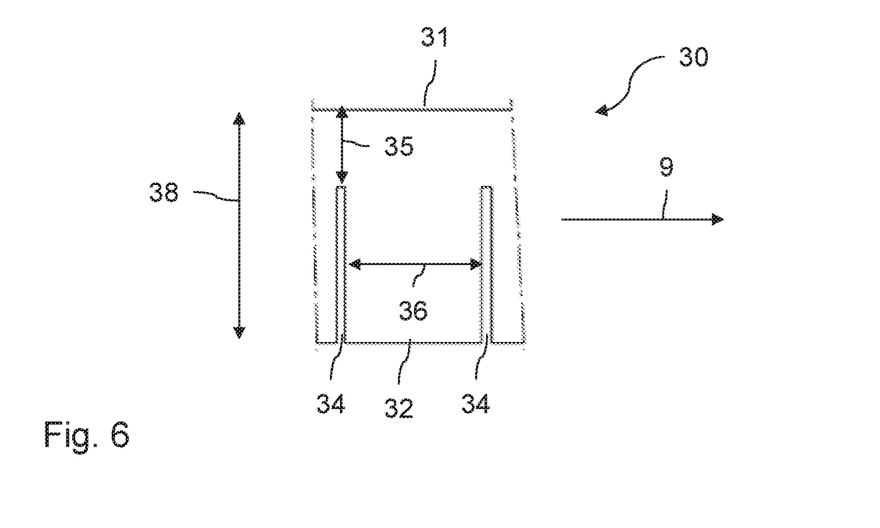
FIG. 6 shows a section of a laminate strip of a third type in a side view.

So that a quasi-isotropic honeycomb core 1 can be produced with the triangular cells 2, three different types of laminate strips are provided, which are each shown in a section in FIGS. 4 to 6.

FIG. 4 shows a section of a laminate strip 10 of a first type, which extends in the direction of the arrow 9 from left to right in the drawing plane. A first longitudinal side of the laminate strip 10 is identified by 11, a second longitudinal side by the reference sign 12. The first and the second longitudinal side run, e.g., parallel to one another. The laminate strip 10 has first slots 13 and second slots 14 distributed at regular intervals. The first slots 13 extend, starting out from the first longitudinal side 11, by a third transversely (i.e., at a 90° angle) to the direction of extension 9. In a corresponding manner, the second slots 14 extend, starting out from the second longitudinal side 12, likewise by a third transversely to the direction of extension 9. As is clearly visible, the first and second slots run in a straight line transversely to the direction of extension. The web 15 remaining between a slot 13 and a slot 14 (which lie in a straight line) accordingly likewise has a width of a third of the overall width 18 between the first and the second longitudinal side 11, 12. The spacing 16 formed between two adjacent slots 13 and 14 corresponds to the width of the cell wall 7 as shown in FIG. 2.

FIG. 5 shows a laminate strip 20 of a second type, wherein only a section of the laminate strip 20 extending in the direction of the arrow 9 is shown. The laminate strip 20 comprises slots 23 distributed at regular intervals, which extend, starting out from a first longitudinal side 21, by two thirds transversely to the extension direction 9. A web 25 remaining between the end of the slot 23 and the second longitudinal side 22 thus takes up a third of the width 28 of the laminate strip 20. A distance 26 extending in the extension direction 9 between two adjacent slots 23 is identified by the reference sign 26. In cells 2 that have the shape of an equilateral triangle, the spacing 26 corresponds to the spacings 16 and 17 of the first laminate strip 10.

FIG. 6 shows a section of a laminate strip 30 of a third type, which extends with its long side again in the direction of the extension direction 9. The laminate strip 30 has a first longitudinal side 31 and a second longitudinal side 32. The laminate strip 30 comprises slots 34 distributed at regular intervals. The slots 34 extend, starting out from the second longitudinal side 32, by two thirds transversely to the extension direction. This means in turn that the web 35 (which forms an extension of the slot 34) remaining between the end of the slot 34 and the first longitudinal side 31 has a third of the width 38 of the laminate strip 30. Two adjacent slots 34 have a spacing 36 relative to one another. In a cell that has the shape of an equilateral triangle in cross section, the spacing 36 corresponds to the spacings 16, 17 of the laminate strip 10 and the spacing 26 of the laminate strip 20.

The widths 18, 28, 38 of the laminate strips 10, 20, 30 are preferably identical. It is likewise preferable if the material thickness (i.e., the thickness of the laminate strips 10, 20, 30 resulting in a direction perpendicular to the sheet level) is the same.

The honeycomb core shown in FIG. 1 is produced by plugging the laminate strips 10, 20, 30 together. The honeycomb core 1 is produced in this case in such a way that first the laminate strips 20 of the second type are arranged on a flat base, so that their slots 23 point away from the base. Here the number of laminate strips 20 of the second type is arranged parallel on the base. The arrangement of the laminate strips 20 likewise takes place in such a way that these are arranged in a direction perpendicular to their respective extension direction with equal spacing on the base (equidistance). The laminate strips 20 are oriented in this case in such a way that their respective slots 23 of adjacent laminate strips 20 form a line.

The laminate strips 10 of the first type are then plugged from above into the laminate strips 20, so that the slots 14 of the laminate strips 10 of the first type, which face the laminate strips 20, engage in their slots 23. Then the laminate strips 30 of the third type are inserted from above into the laminate strips 10, so that the slots 34 of the laminate strips 30 engage in the slots 13, which face the laminate strips of the second type.

No device is necessary to assemble the honeycomb core 1 in the manner described above.

To fix the inserted laminate strips 10, 20, 30, the slots 13, 14, 23, 34 of the laminate strips 10, 20, 30 of one or more types can be provided with adhesive or synthetic resin. This can be done prior to assembly. The application of the adhesive or synthetic resin can also take place following assembly.

Figure 3:
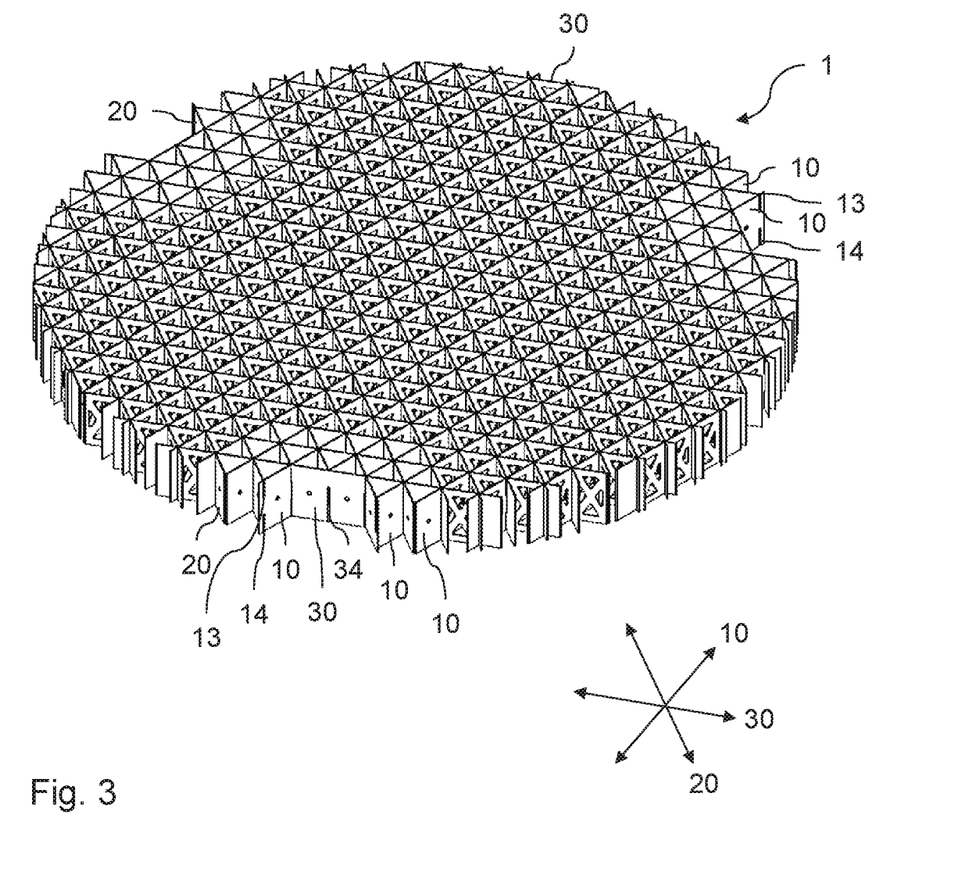
FIG. 3 shows a representation in perspective of a honeycomb core according to the invention.

The width 18, 28, 38, the length (in extension direction 9) and the number of laminate strips 10, 20, 30 determine the height, length and width of the honeycomb core 1. This is shown in an exemplary manner in a representation in perspective in FIG. 3, wherein the directions of the laminate strips 10, 20, 30 are illustrated by an arrow system shown outside the honeycomb core 1. As is clearly visible, the laminate strips 10 of the first type extend from bottom left to top right. The laminate strips 20 of the second type extend from top left to bottom right. The laminate strips 30 of the third type substantially extend from left to right. It is unnecessary to note that the extension directions described here refer only to the representation shown in FIG. 3.

Figure 7:
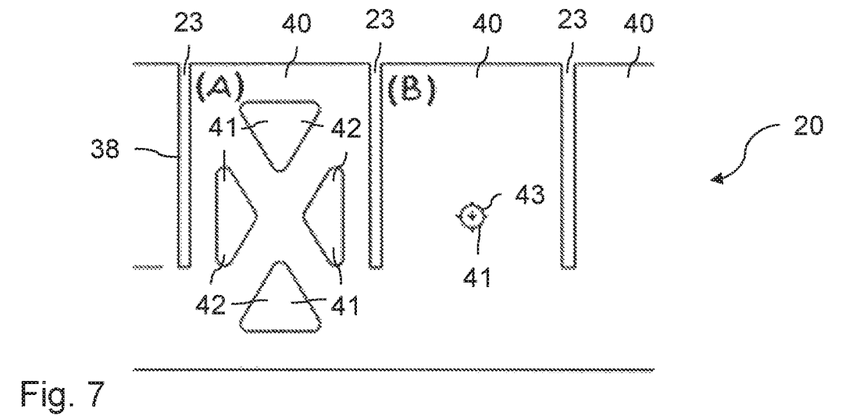
FIG. 7 shows a section of a laminate strip of the second type, wherein openings are shown by way of example in two sections between adjacent slots.

The laminate strips 10 and/or 20 and/or 30 can have uninterrupted cell walls, i.e., cell walls in which the sections 40 between two slots are not provided with any opening. The sections 40 can also be provided with openings 41, wherein the openings can be formed as a ventilation opening 43 or lightening hole 42. The latter are used to reduce the weight of the honeycomb core 1 without substantially influencing the stability. This is shown by way of example in FIG. 7, for example, which shows a section of the laminate strip 20. The openings 42 can also be seen in the representation in perspective in FIG. 3, wherein here the openings are provided in all types of laminate strips 10, 20, 30 in a plurality of cells.

Figure 8:
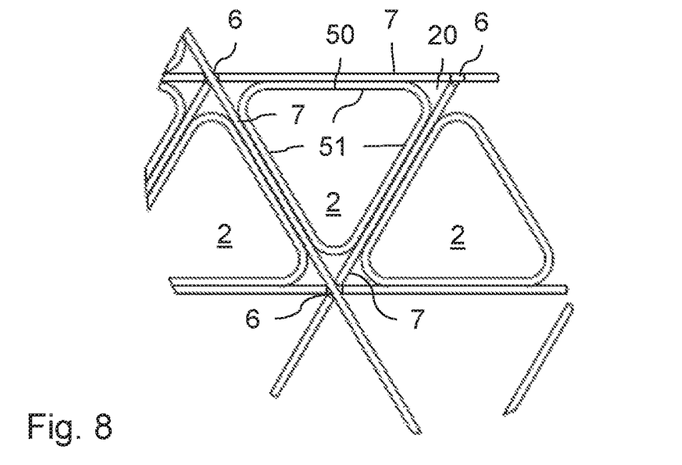
FIG. 8 shows an enlarged section of a honeycomb core according to the invention in a top view, wherein inserts for load introduction are arranged in some cells of the honeycomb core.

The honeycomb core 1 can be provided for local reinforcement of the cells 2 with reinforcing inserts (in short: inserts) 50 if this should be required for reasons of load introduction. Such cells, which are provided with reinforcing inserts 50, can be provided in the area of the recesses 8 of the honeycomb core 1, for example. FIG. 8 shows a section from the honeycomb core 1 in a top view, wherein several adjacently arranged cells 2 are provided with reinforcing inserts 50. The reinforcing inserts 50 have a triangular cross section matched to the respective cell 2, wherein a particular insert wall 51 of a reinforcing insert abuts an assigned cell wall 7 of the cell 2.

Figure 9:
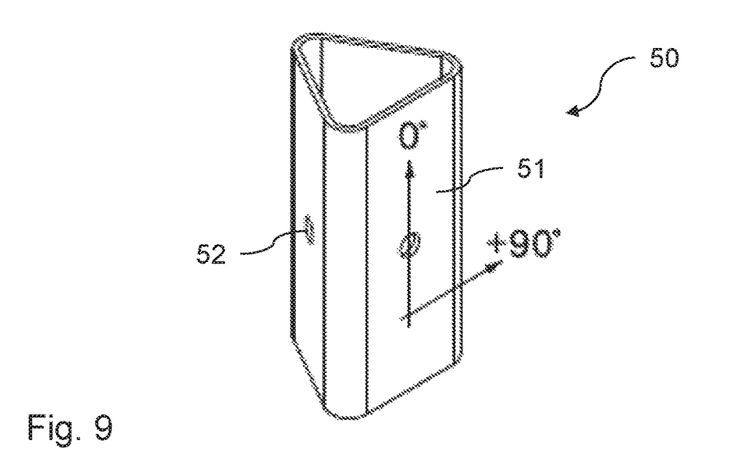
FIG. 9 shows a representation in perspective of an insert for load introduction.

A cured CFRP shaped piece, a wet-formed, laminated composite insert, a shaped metal piece, a shaped piece of rigid foam or a shaped piece of plastic can be used as a reinforcing insert, for example. A reinforcing insert 50 of this kind is shown in a representation in perspective in FIG. 9. The respective cell walls 51 are provided with an opening 52 only by way of example.

The honeycomb core 1 thus produced can be fabricated cost-effectively from any carbon fiber with any resin system.

Due to a freely selectable cell width (i.e., the distance between two slots of a laminate strip) and its wall thickness, the honeycomb core can be adapted flexibly to the design requirements of a target application.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

REFERENCE SIGN LIST

1 Honeycomb core
2 Cell
3 First corner of the cell 2
4 Second corner of the cell 2
5 Third corner of the cell 2
6 Intersection point
7 Cell wall
8 Recess
9 Extension direction
10 Laminate strip of the first type
11 First longitudinal side
12 Second longitudinal side
13 First slot
14 Second slot
15 Web remaining between first and second slot 13, 14 lying in a line
16 Spacing between two adjacent first slots 13
18 Width of the laminate strip 10
17 Spacing between two adjacent second slots 14
20 Laminate strip of the second type
21 First longitudinal side
22 Second longitudinal side
23 Slot
25 Web remaining between slot 23 and second longitudinal side 22
26 Spacing between two adjacent slots 23
28 Width of the laminate strip 20
30 Laminate strip of the third type
31 First longitudinal side
32 Second longitudinal side
34 Slot
35 Web remaining between slot 34 and first longitudinal side 31
36 Spacing between two adjacent slots 34
38 Width of the laminate strip 30
40 Section between two slots of a laminate strip
41 Opening
43 Ventilation opening
42 Lightening hole
50 Insert
51 Insert wall
52 Opening

The invention claimed is:

1. A honeycomb core for dimensionally stable panels and reflectors in a sandwich construction,
the honeycomb core comprising a plurality of cells with a triangular cell cross section made from carbon fiber reinforced plastic,
the honeycomb core being assembled from flat laminate strips connected to one another, the laminate strips being formed quasi-isotropic, the laminate strips each having first and second longitudinal sides forming lateral edges of the laminate strips and a width extending transversely between the first and second longitudinal sides, the assembled laminate strips forming lateral cell walls of the plurality of cells, each cell of the plurality of cells formed by the assembled laminate strips have open upper and lower faces, the laminate strips having slots running transversely to an extension direction of the first and second longitudinal sides, the laminate strips made of cured carbon fiber reinforced plastic and being configured to be connected to one another in such a way that the slots of three laminate strips engage in a positive-locking manner in one another at a respective intersection point thereby forming the honeycomb core without the provision of further stabilizing elements, the respective intersection point forming respective corners of a cell of the plurality of cells of the honeycomb core;

wherein the laminate strips comprise a number of laminate strips of a first type, which comprise first and second slots distributed at regular intervals, wherein the first slots extend, starting out from a first longitudinal side, by a third of the width transversely to the extension direction and wherein the second slots extend, starting out from a second longitudinal side, by a third of the width transversely to the extension direction, and wherein each first slot is aligned with a second slot;

a number of laminate strips of a second type, which comprise slots distributed at regular intervals, wherein the slots extend, starting out from a first longitudinal side, by two thirds of the width transversely to the extension direction; and a number of laminate strips of a third type, which comprise slots distributed at regular intervals, wherein the slots extend, starting out from a second longitudinal side, by two thirds of the width transversely to the extension direction;

wherein the widths of the first type, the widths of the second type, and the widths of the third type of laminate strips are equal.

2. The honeycomb core according to claim 1, wherein the spacings of the first and second slots of the laminate strips of the first type running in a transverse direction, the spacings of the slots of the laminate strips of the second type running in a transverse direction and the spacings of the slots of the laminate strips of the third type running in a transverse direction, are dimensioned in such a way that the spacings correspond to the length of the lateral edges of the triangular cell cross section.

3. The honeycomb core according to claim 1, wherein the laminate strips of an identical type are arranged parallel to one another in the honeycomb core.

4. The honeycomb core according to claim 1, wherein the cells comprise equilateral triangles.

5. The honeycomb core according to claim 1, wherein the laminate strips have an identical thickness to one another.

6. The honeycomb core according to claim 1, wherein the slots engaging in one another of three laminate strips are fixed at an intersection point by an adhesive or a synthetic resin.

7. The honeycomb core according to claim 1, wherein the lateral edges of the laminate strips of at least one main side of the honeycomb core lie in one plane following completed assembly.

8. The honeycomb core according to claim 1, wherein a section of at least one of the laminate strips, which is arranged between two adjacent slots in the extension direction, comprises one or more openings.

9. A reflector in sandwich construction, for an optical mirror in lightweight construction, comprising a honeycomb core according to claim 1.

10. A sandwich panel in lightweight construction, for dimensionally stable applications, comprising a honeycomb core according to claim 1.

11. A method for the manufacture of a honeycomb core according to claim 1, with the following steps:
a) providing a number of laminate strips of the first type, providing a number of laminate strips of the second type and providing a number of laminate strips of the third type;
b) arranging the number of laminate strips of the second type on a level base, so that their slots point away from the base;
c) inserting the number of laminate strips of the first type from above into the laminate strips of the second type, so that the slots of the laminate strips of the first type, which face the laminate strips of the second type, engage in the slots of the laminate strips of the second type;
d) inserting the number of laminate strips of the third type from above into the number of laminate strips of the first type, so that the slots of the laminate strips of the third type engage in the slots of the laminate strips of the first type, which face the laminate strips of the third type.

12. The method according to claim 11, in which the number of laminate strips of the third type are arranged parallel on the base.

13. The method according to claim 11, in which the number of laminate strips of the third type are arranged in a direction perpendicular to their respective extension direction with an equal spacing on the base.

14. The method according to claim 11, in which the number of laminate strips of the second type is oriented in such a way that assigned slots of adjacent laminate strips of the third type form a line.

* * * * *